Oct. 31, 1939.  C. C. FARMER  2,177,961
BRAKE MECHANISM
Filed Jan. 28, 1939  4 Sheets-Sheet 4
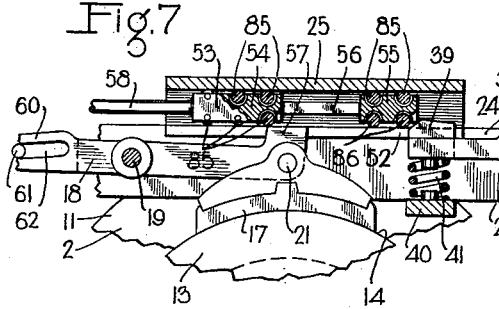
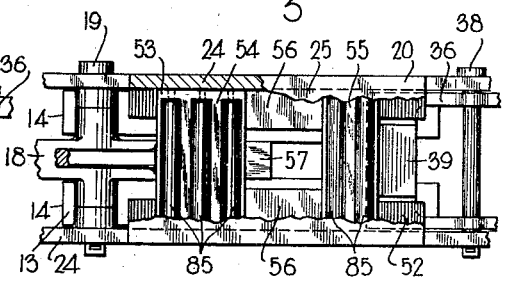
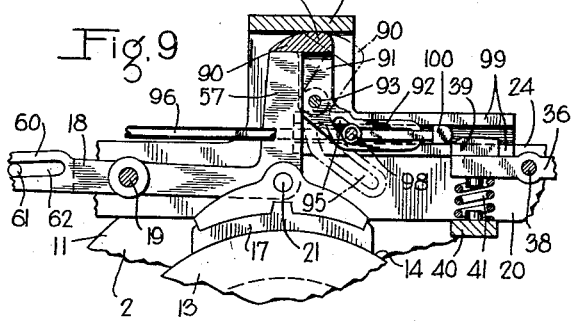
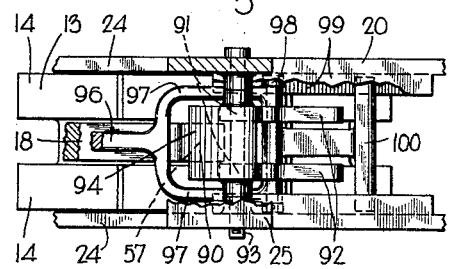
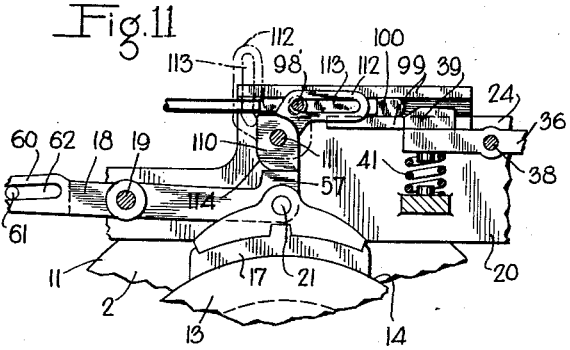
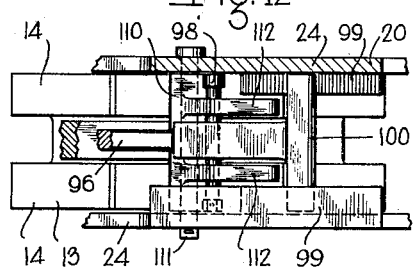
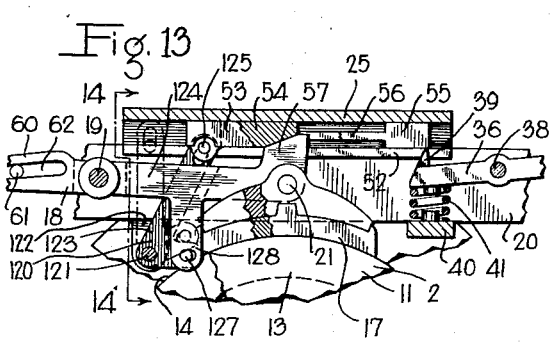
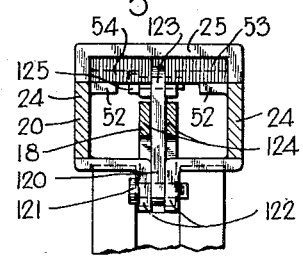
INVENTOR
CLYDE C. FARMER
BY
ATTORNEY Patented Oct. 31, 1939

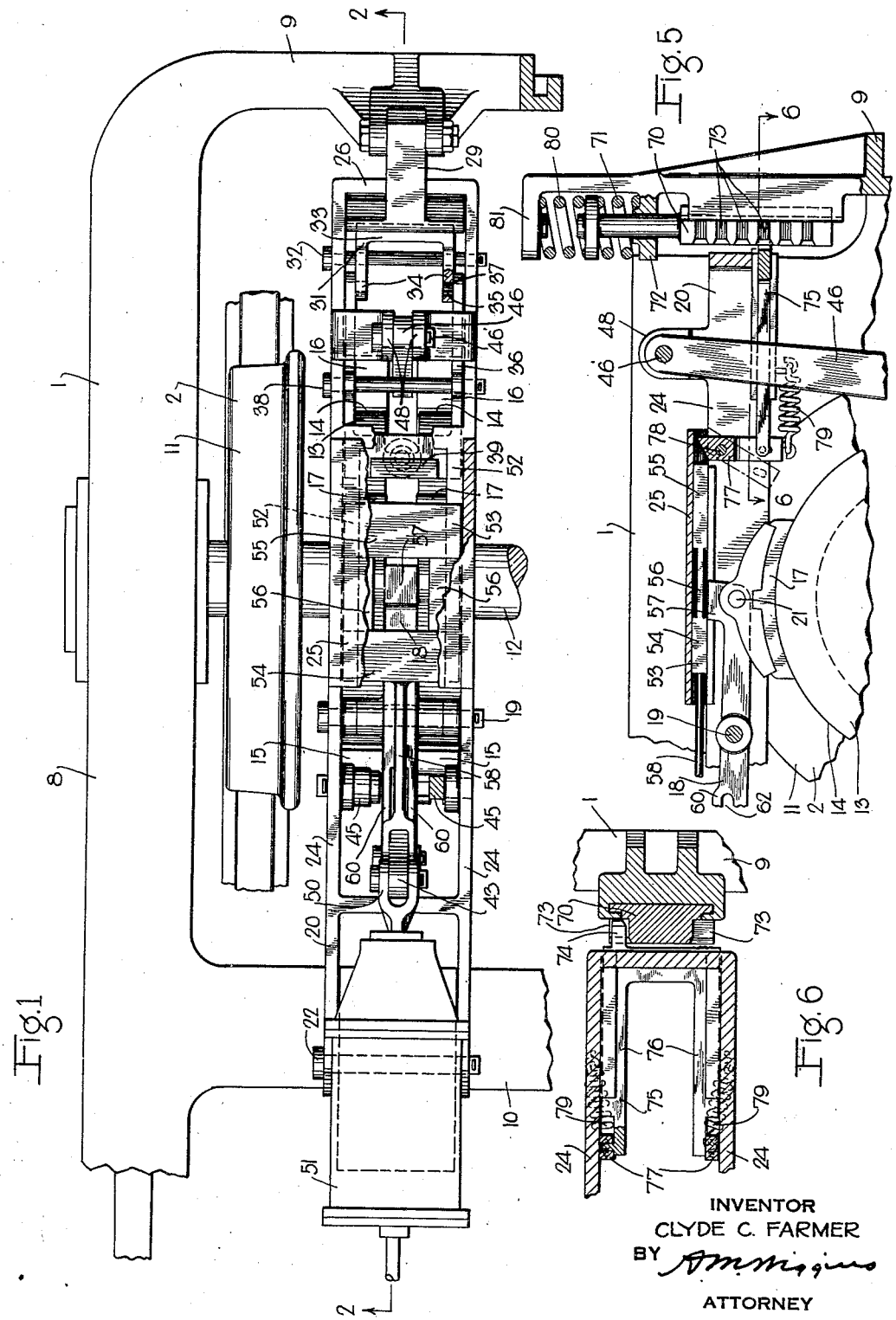
Oct. 31, 1939.  C. C. FARMER  2,177,961
BRAKE MECHANISM
Filed Jan. 28, 1939  4 Sheets-Sheet 1
INVENTOR
CLYDE C. FARMER
BY
ATTORNEY Oct. 31, 1939.    C. C. FARMER    2,177,961
BRAKE MECHANISM
Filed Jan. 28, 1939    4 Sheets-Sheet 2
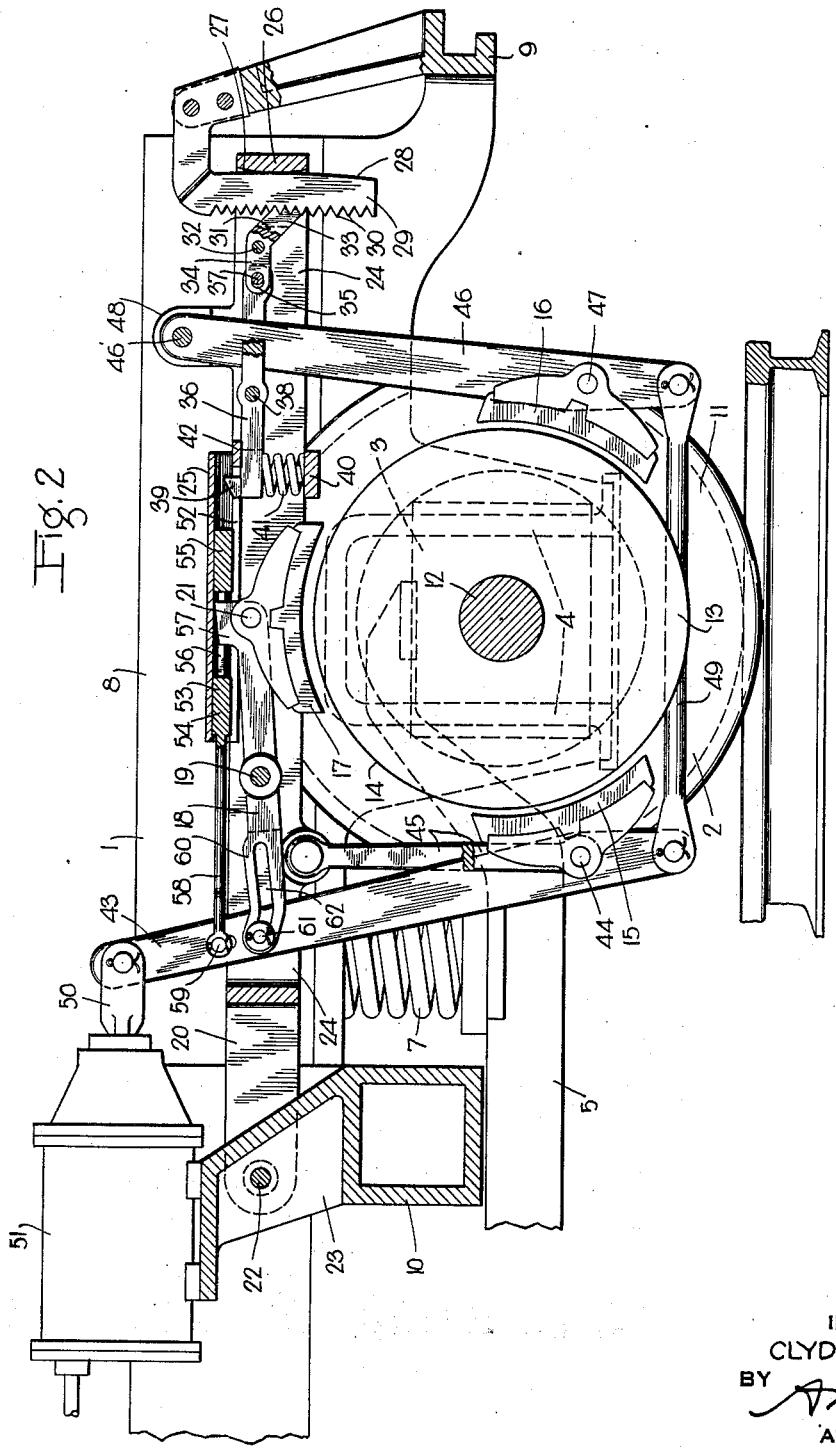
INVENTOR
CLYDE C. FARMER
BY
ATTORNEY

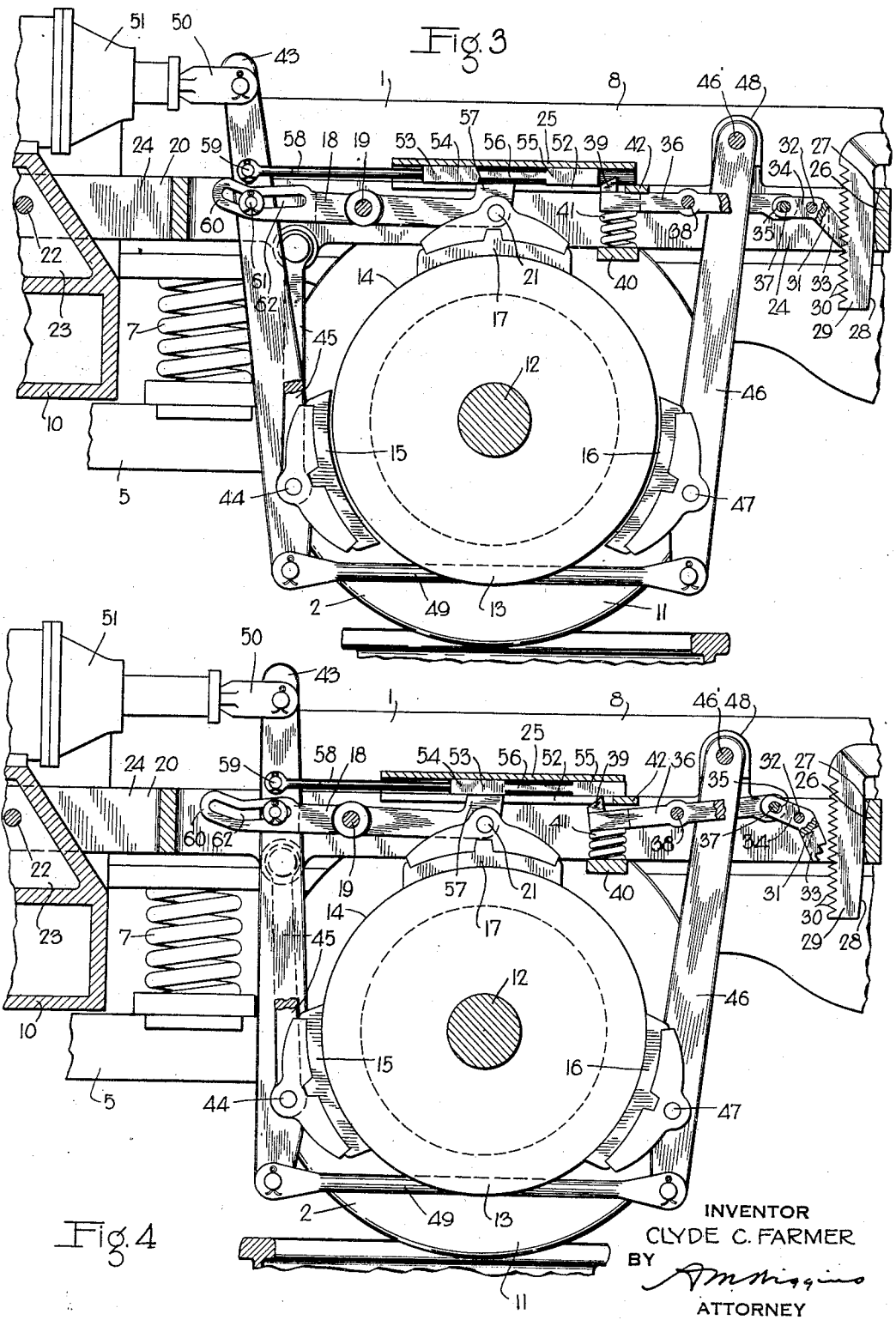

2,177,961

UNITED STATES PATENT OFFICE 2,177,961

BRAKE MECHANISM

Clyde C. Farmer, Pittsburgh, Pa., assignor to The Westinghouse Air Brake Company, Wilmerding, Pa., a corporation of Pennsylvania Application January 28, 1939, Serial No. 253,356

32 Claims. (Cl. 188—58)

This invention relates to brake mechanism for railway vehicle trucks and more particularly to that type of brake mechanism disclosed in a prior pending application for United States Letters Patent, Serial No. 214,517, filed June 18, 1938, in which, in effecting an application of the brakes, downwardly directed forces set up in the mechnism upon the frictional braking engagement of one or more brake shoes with a wheel and axle assembly of the truck will be transmitted through the medium of an additional brake shoe or pair of brake shoes to the assembly instead of to the frame of the truck, the additional brake shoe or shoes also serving materially to brake the assembly.

The brake mechanism disclosed in the above mentioned pending application is of the clasp type and comprises a single brake cylinder and a single system of operatively connected levers for actuating clasp arranged brake shoes into and out of frictional braking engagement with a wheel or a brake drum of a wheel and axle assembly of the truck, and further comprises a brake carrier which normally supports the system of levers from the truck frame and which is actuated by said system, when an application of the brakes is initiated, to move another brake shoe into engagement with the wheel and axle assembly to assist in braking the assembly and to support the greater portion of the load imposed on the system by the clasp arranged brake shoes while such shoes are in frictional braking engagement with the wheel and axle assembly. Thus, the additional load due to braking is substantially wholly carried by the wheel and axle assembly instead of the truck frame.

In this type of brake mechanism the brake carrier extends longitudinally of the truck and at its inner end is pivotally connected to the frame of the truck so that it is rockable vertically relative to the frame in directions toward and away from the wheel and axle assembly, there being a release spring carried by the truck frame which normally supports the outer end of the brake carrier and which yields to the force set up in the mechanism by the clasp arranged brake shoes when such shoes are in braking engagement with the assembly. Operatively connected to this brake carrier is a pair of brake shoes which are movable by the carrier into and out of braking engagement with rotatable friction braking surfaces of the assembly, downward movement of the carrier being due to the force exerted thereon by the clasp arranged brake shoes when such shoes are in braking engagement with the assembly.

In effecting an application of the brakes the force of the release spring which supports the carrier must be overcome before the brake shoes which are operated by the carrier can frictionally engage the assembly, thus the spring acts to prevent these brake shoes from being forced against the braking surfaces of the wheel and axle assembly with as great a pressure as would be the case if the spring were omitted. In some instances this might be considered objectionable, and with this in mind, it is an object of the invention to provide a brake mechanism of the above mentioned type with a brake carrier arrangement which provides for the movement of the brake shoes carried by the brake carrier to move to their braking position without any opposition other than immaterial frictional resistance set up by the sliding contact between the several associated parts of the arrangement.

Another object of the invention is to provide a brake mechanism of the above mentioned type with novel locking means for normally locking the brake carrier to the frame of the truck, for unlocking the carrier, in effecting an application of the brakes, prior to the clasp arranged brake shoes being moved into frictional braking engagement with the wheel and axle assembly, and in releasing the brakes for automatically locking the carrier to the frame of the truck immediately following the withdrawal of the clasp arranged brake shoes out of braking engagement with the wheel and axle assembly.

Another object of the invention is to provide the brake carrier with one or more brake shoes which are movable relative to the carrier into engagement with the wheel and axle assembly in effecting an application of the brakes and out of such engagement in effecting a subsequent release of the brakes, and to which the carrier is adapted to apply pressure after the brake shoe or shoes carried thereby are in engagement with the assembly, and a further object is to provide means for actuating the brake shoe or shoes, and to provide a lock controlling means operative in effecting the application of the brakes to first establish a solid connection between the carrier and the brake shoe or shoes and then actuating the brake carrier locking means out of locking position. A further feature of the lock controlling means is that it will function, in effecting the release of the brakes, to first permit the locking means to move to its locking position and then free the brake shoe or shoes so that they may be moved relative to the carrier to their normal release position.

A further object of the invention is to provide a brake mechanism of the above mentioned type with automatically operative means for insuring the withdrawal of the friction braking surface of the brake shoe or shoes associated with the brake carrier the same distance from the braking surface of the wheel and axle assembly every time the brakes are released, regardless of the wear of either or both of these braking surfaces and regardless of the position which the truck frame may assume with relation to the wheel and axle assembly in response to variations in the weight carried by the truck frame.

Other objects and advantages will appear in the following more detailed description of the invention.

In the accompanying drawings Fig. 1 is a fragmentary plan view of a portion of a railway vehicle truck embodying the invention, portions of the apparatus being broken away to more clearly illustrate other portions which would otherwise be hidden; Fig. 2 is a longitudinal vertical sectional view taken on the line 2—2 of Fig. 1; Figs. 3 and 4 are vertical sectional views similar to Fig. 2 but showing the several parts of the mechanism in two different positions which it assumes when an application of the brakes is initiated; Fig. 5 is a fragmentary sectional view corresponding, as far as shown, to Fig. 3 but illustrating a modified form of the brake carrier locking or holding mechanism; Fig. 6 is a horizontal sectional view taken on the line 6—6 of Fig. 5; Figs. 7, 9 and 11 are fragmentary sectional views each, as far as shown, corresponding to Fig. 3 but illustrating a modified form of the means for forming a strut or solid connection between the brake carrier and the brake shoes associated therewith and also illustrating a modified form of means for controlling the brake carrier holding means; Figs. 8, 10 and 12 are plan views of the mechanisms shown in Figs. 7, 9 and 11, respectively, portions being shown broken away to more clearly illustrate the mechanism; Fig. 13 is a fragmentary sectional view which, as far as is shown, corresponds to Fig. 3 but which illustrates a still further modified form of actuating means for the strut and brake carrier holding or locking means; and Fig. 14 is a vertical cross sectional view taken on the line 14—14 of Fig. 13. In Figs. 5 to 14, inclusive, all unnecessary parts of the truck frame and wheel and axle assembly have for the sake of clarity been omitted.

For illustrative purposes the invention is shown embodied in a railway vehicle truck of the usual type which may comprise a cast metal truck frame 1, two or more longitudinally spaced wheel and axle assemblies 2, axle journal boxes 3, mounted between the usual pairs of pedestal jaws 4 of the truck frame, equalizer bars 5 extending longitudinally of the truck and resting on the journal boxes, and truck frame supporting springs 7 which are seated on the equalizers. The truck frame may comprise spaced side frames 8 which are connected together at their ends by suitable transversely extending end pieces 9 and which intermediate their ends, are connected together by spaced transversely extending transoms 10. Each wheel and axle assembly may comprise spaced wheels 11 which are secured to an axle 12 and may further comprise two brake drums 13 which are each located adjacent one of the wheels and is secured to the axle for rotation with the assembly.

In the drawings only those portions of the truck just described which are deemed necessary for a clear understanding of the invention have been shown. It should here be mentioned that the drawings illustrate one brake mechanism embodying the invention but it will be understood that there will be two of such mechanisms for each wheel and axle assembly and that the following description will, for the sake of simplicity, be limited more or less to a single mechanism.

In the present embodiment of the invention the brake drum 13 is located at the inner side of the wheel 11 and is secured directly to the axle 12 but it will be understood that it may be secured to the wheel or any other part which rotates with the wheel. This drum is provided with two laterally spaced peripheral friction braking surfaces 14 which are adapted to be frictionally engaged by brake elements 15, 16 and 17, radially arranged about the drum in pairs, the elements of each pair being laterally spaced to correspond with the spacing of the braking surfaces of the drum. The greater portions of the elements 15 and 16 are located below the horizontal center line of the drum and at opposite sides of the drum and the elements 17 are located above the drum. It will be understood that each brake element may comprise the usual brake shoe and brake shoe head, and since this combination of head and shoe is so well known by those skilled in the brake art, the elements will, for the sake of clarity, be hereinafter referred to by either the term brake shoe or brake shoes.

The brake shoes 17 are pivotally carried by the outer end of a lever 18 which is pivotally connected intermediate its ends by means of a pin 19 to a combined lever and brake rigging supporting member 20 which extends longitudinally of the truck and over the top of the brake drum. The lever 18 extends longitudinally of the member 20, and the brake shoes 17 are arranged one on each side of the lever and are operatively connected to the lever by means of a pin 21.

The inner end of the member 20 is pivotally connected by means of a pin 22 to spaced lugs 23 which are preferably formed integral with one of the transoms 10 and which, in the present embodiment of the invention, project upwardly from the transom. This member preferably comprises laterally spaced parallel side pieces 24 which are integrally connected together intermediate their ends by a horizontally disposed web 25 and at their outer ends by a vertically disposed end piece 26 having a concave inner surface 27 which may slidably engage the curved outer edge surface 28 of a vertically disposed downwardly depending locking bar 29 carried by the adjacent end piece 9 of the truck frame and extending between the side pieces 24. The radius of the edge surface 28 is struck from the center of the pivot point of the member 20, so that the member 20 may be moved vertically throughout its travel without danger of the surface 28 thereof binding on the edge. It should here be mentioned that normally there is a slight operating clearance between the surfaces 27 and 28 to permit free rocking movement of the member. If for any reason the surface 27 should engage the surface 28 the frictional resistance, due to such engagement, to the free rocking movement of the member 20 will be negligible for the reason that since the surface 27 is concave there will be only a line contact between the surfaces.

The inner edge of the locking bar 29 is provided with locking teeth 30 which are adapted to be engaged by corresponding teeth of a locking latch 31 which is located between the side pieces 24 of the member 20 and which is pivotally connected intermediate its ends to the outer end of the member by means of a transversely extending pin 32 carried by the side pieces, the latch being in the form of a bell crank having arms 33 and 34 which are disposed at an angle to each other. The arm 33 carries the teeth which are adapted to engage the teeth of the locking bar and when the teeth are in such engagement the arm slopes downwardly and outwardly toward the outer end of the member, while the arm 34 is horizontally disposed and extends parallel with the side pieces 24 of the member.

The arm 34 is provided with a longitudinally extending slot 35 and is pivotally connected to the outer laterally spaced ends of a latch controlling lever 36 by means of pins 37 which are carried by the outer laterally spaced ends of lever and which operatively engage the arm within the slot. The lever 36 is located between and extends parallel with the side pieces 24 of the member 20 and intermediate its ends is pivotally connected to the side pieces by means of a transversely extending pin 38. The inner end of the lever is provided with an upwardly extending lug 39 which is of such a length that when the latch 31 is in engagement with the teeth of the locking bar, the upper end thereof will be positioned above the upper edges of the side pieces 24 of the member.

Interposed between and operatively engaging the underside of this end of the lever 36 and a spring seat 40 with which the member 20 is provided is a spring 41 which acts to normally maintain the lever 36 in position to maintain the latch 31 in its locking position. At the right hand side of the lug 39 the member 20 is provided with a stop 42 which, in the present embodiment of the invention extends across the space between the side pieces 24 and is integrally connected therewith, and which is adapted to engage the lever 36 to prevent excessive upward movement thereof.

The brake shoes 15 which are located at one side of the brake drum are arranged one on each side of a vertically disposed brake cylinder lever 43 and are pivotally connected to such lever intermediate its ends by a pin 44 which is carried by a pair of spaced hangers 45 which are pivotally connected at their upper ends to the side pieces 24 of the member 20.

The brake shoes 16 which are located at the other side of the brake drum are arranged one on each side of a vertically disposed hanger lever 46 and are operatively connected to the levers by a pin 47. In the present embodiment of the invention the upper end portion of the lever extends between and above the side pieces 24 of the member 20 and at its extreme upper end is pivotally connected by a transversely extending pin 48 to a pair of spaced lugs 48 which are integral with the side pieces 24 and which extend upwardly therefrom. It should here be mentioned that in the present embodiment of the invention the hanger lever extends through the horizontal plane of the latch controlling lever 36 and that this controlling lever in the vicinity of the hanger lever comprises side pieces which are spaced apart laterally a sufficient distance that each lever is freely operable without interference by the other.

Below the brake shoes 15 and 16 the lower ends of the levers 43 and 46 are operatively connected together by a longitudinally extending connecting rod 49.

In the present embodiment of the invention the upper end portion of the brake cylinder lever 43 extends between and above the side pieces 24 of the member 20, and above the member is operatively connected to the push rod 50 of a brake cylinder device 51 of the usual type which may be rigidly secured to a transom of the truck frame.

Located above the brake shoe 17 and slidably guided by the web 25 of the member 20 and longitudinally extending lugs 52 which are preferably integral with the side pieces of the member, is a longitudinally movable member 53 which, as shown in Figs. 3 and 4 is provided for the purpose of formng a rigid strut between the brake shoe 17 and the member 20 and for actuating the latch controlling lever 36 when an application of the brakes is being effected. It will here be noted that while the member 53 is readily slidable longitudinally relative to the member 20 it cannot move vertically relative to the member for the reason that for the exception of necessary but slight operating clearance the member 53 fills the space between the web 25 and lugs 52 of the member 20. This member 53 comprises a strut portion 54 and a lever actuating portion 55, which portions are spaced apart longitudinally but are integrally connected together by laterally spaced longitudinally extending webs 56, the space between such webs being provided to accommodate an upwardly extending lug or strut element 57 of the lever 18 when the member is in its normal position as shown in Fig. 2, and as will hereinafter more fully appear. The member further comprises a longitudinally extending rod portion 58 which is integrally connected at one end to the strut portion 54 and which, is pivotally connected at its other end to the upper end portion of the brake cylinder lever 43 by means of a pin 59, the pin accommodating opening in the lever being in the form of a slot to provide an adjustable connection between the lever and the rod portion which will permit the lever to move through an arc of a circle without causing any binding action between the several parts of the connection.

The inner end of the lever 18 comprises laterally spaced jaw members 60 between which the brake cylinder lever 43 extends. These jaw members are operatively connected to the brake cylinder lever by means of a transversely extending pin 61, the pin accommodating opening in each jaw member 60 being in the form of a slot 62 which extends longitudinally of the jaw member, the end portion of the slot, adjacent the inner end of the lever, extending upwardly at on obtuse angle to the remaining portion of the slot, so that when the brake cylinder lever is moved in the brake applying direction, i. e., in a direction toward the right hand as viewed in Fig. 2, the pin 61, which is in contact with the lever 18, will cause the lever to be rocked in a clockwise direction about its pivot pin 19 to move the brake shoes 17 downwardly into engagement with the brake drum, all of which will be set forth in more detail in the following description of the operation of the mechanism.

*Operation of the brake mechanism*

Assuming the several parts of the brake mechanism to be in brake release postion and the brake carrier member locked in position by the locking latch 31 as shown in Fig. 2. In this position the brake shoes 15 and 16 will be spaced away from the braking surfaces of the brake drum 13 the usual distance while the brake shoes 17 are spaced away from these braking surfaces a greater distance. The clearance space between the braking surfaces of the brake shoes 17 and the braking surfaces of the brake drum should be such that these shoes will not accidentally engage the brake drum when the shoes move downwardly with the truck frame in response to the shocks to which the truck is subjected in ordinary train service.

It will be noted that with the brake cylinder lever 43 in brake release position the pin 61 carried thereby will maintain the lever 18 and thereby the brake shoes 17 in their release position, and that the member 53 will be in release position, all as shown in Fig. 2, the strut portion 57 of the lever 18 extending into the space between the webs 56 of the member 53.

When it is desired to effect an application of the brakes fluid under pressure is admitted to the brake cylinder device 51, causing this device to function to move the push rod 50 and thereby the upper end of the brake cylinder lever 43 outwardly, i. e., in the direction toward the right hand as viewed in Fig. 2. The brake cylinder lever, as it thus moves, shifts the member 53 and pin 61 in the same direction, the pin 61 acting on the slotted end of the lever 18 to cause the lever to rock in a clockwise direction about the pin 19 to move the brake shoes 17 downwardly from their normal release position, in which they are shown in Fig. 2, to their brake drum engaging position as shown in Fig. 3. At substantially the same time as these brake shoes engage the brake drum the pin 61 will be out of the inclined portion of the slot 62, so that further forward movement of the pin 61 by the brake cylinder lever will not cause a downward pressure to be applied to the brake shoes, consequently the lever 18 will offer no material frictional opposition to the movement of the brake cylinder lever 43.

At substantially the same time as the brake shoes 17 engage the brake drums 13, the upper surface of the strut portion 57 of the lever 18 will have been brought flush with the upper surfaces of the guide lugs 52 of the brake carrier 20, and immediately thereafter the strut portion 54 of the member 53 starts to overlap the upper surface of the strut portion 57 of the lever 18, so that there is now a rigid strut connection between the member 20 and the brake shoes 17. Immediately after this rigid strut connection has been established the lever actuating portion 55 of the member 53 engages the lug 39 of the latch controlling lever 36 causing the lever to rock in a counter-clockwise direction about its pivot pin 38 to rock the locking latch 31 in the opposite direction about its pivot pin 32 out of locking engagement with the teeth 30 of the locking bar 29.

After the locking latch 31 has thus been moved out of engagement with the locking bar 29, the further movement of the brake cylinder lever 43 toward the right will cause the brake shoes 15 to engage the brake drum, after which the lever will rock about the pin 44 and, through the medium of the connecting rod 49, cause the hanger lever 46 to rock in a clockwise direction about its pivot pin 41 to bring the brake shoes 16 into engagement with the brake drum as shown in Fig. 4.

The brake shoes 16 and 17 being located below the horizontal center line of the brake drum will now have a tendency to move downwardly around the drum toward each other, thereby creating downwardly directed forces which are transmitted to the brake shoes 17 through the medium of the hangers 45, hanger lever 46, member 20, strut portion 54 of the member 53 and the strut element 57 of the lever 18.

When it is desired to release the brakes, fluid under pressure is discharged from the brake cylinder device 51 whereupon the several parts of the device and mechanisms move to their normal release position as shown in Fig. 2. As the brake cylinder lever 43 moves toward its release position it causes the latch actuating portion 55 of the member 53 to move out of engagement with the latch control lever 36, thereby permitting the compressed spring 41 to act to rock the control lever in a clockwise direction about its pivot pin 38, such movement of the control lever causing the latch to rock in the same direction about its pivot pin 32 into locking engagement with the teeth 30 of the locking bar 31. Immediately after the latch actuating portion of the member 53 moves out of engagement with the control lever the strut portion 54 moves out of the path of travel of the strut element 57 of the lever 18, and at substantially the same time as this occurs the pin 61 carried by the brake cylinder lever reaches the offset portion of the slot in the lever 18 and thereafter actuates the lever until the pin reaches the end of the slot to raise the brake shoes 17 from engagement with the brake drum 13 to their normal release position as shown in Fig. 2.

When the brake shoes 15, 16 and 17 are in braking engagement with the brake drum 13 the brake carrier 20 will move downwardly as the brake shoes 17 and drum wear away and, if the wear is great enough to permit the carrier to move a distance slightly greater than the distance between two of the locking teeth 30 of the locking bar 29, the locking latch 31 will, when a release of the brakes is initiated, be moved into locking engagement with the bar before the brake shoes move to their release position, thus locking the brake carrier in its adjusted position. With the carrier thus locked in position the braking surfaces of the brake shoes 17 when the shoes are moved to their release position will be spaced the same distance from the braking surfaces of the drum as they were before the carrier was adjusted. This will be better understood when it is remembered that the degree of movement of the brake shoes 17 relative to the brake carrier is always the same in releasing the brakes and that the position of the brake carrier varies with relation to the drum in accordance with the wear of the shoes and drum.

If, when the several parts of the brake rigging are in their release position, the truck should be subjected to such a severe service shock as to cause the truck frame to move downwardly a distance greater than that between the braking surfaces of the shoes 17 and drum, the brake carrier 20 and brake shoes 17 which start to move downwardly with the truck frame will be brought to a stop when the brake shoes engage the brake drum. When such engagement has been effected the teeth of the locking latch will ratchet over the locking teeth 30 of the locking bar as the locking bar continues to move downwardly with the truck frame. When the locking bar comes to stop the latch again locks the brake carrier to the bar, so that when the truck frame returns to its proper position the brake carrier and brake shoes will move with it. It will here be noted that when the truck frame has been returned to its proper position the distance between the braking surfaces of the brake shoes and brake drum will be greater than that normally provided. However, this is not objectionable for the reason that these severe shocks will not occur often and that upon initiating the first application of the brakes after such an adjustment has been made the locking latch will be moved out of locking engagement with the locking bar 29 and as a consequence the brake carrier 20 and the brake shoes 17 which will have been moved relative to the carrier to their lowermost position will, due to the force of gravity, move downwardly until brought to a stop by the engagement of the shoes with the brake drum. Now when the brakes are released the brake shoes will obviously return to the proper release position in which the braking surface of the brake shoes will be spaced the desired distance from the braking surfaces of the brake drum. It should here be mentioned that when the brake carrier 20 is moved upwardly by the truck frame immediately following the excessive downward movement of the truck frame the brake shoes 15 and 16 will be moved toward the brake drums but the original spacing of the shoes from the drum is such that they will not contact the drum.

From the foregoing description it will be understood that the clearance space between the braking surfaces of the brake shoes 17 and brake drum will be the same upon the release of each application of the brakes regardless of wear of the brake shoes 17 or brake drum or both and regardless of the expected or normal relative vertical movement between the truck frame and wheel and axle assembly.

*Description of the mechanisms shown in Figs. 5 to 14, inclusive*

In Figs. 5 and 6 of the drawings there is shown a modification of the locking mechanism for the brake carrier 20. The other portion of the brake mechanism may be the same as shown in Figs. 1 to 4, inclusive. In this locking mechanism the locking bar which is indicated by the reference character 70 is slidably mounted in the adjacent end piece 9 of the truck frame and is preferably supported on a spring 71 carried by a bracket 72 which as shown may be integral with the end piece of the truck. Below the bracket 72 the two opposite sides of the locking bar are provided with laterally extending spaced locking teeth 73 which are adapted to be engaged by two laterally spaced locking teeth 74 of a longitudinally movable latch member 75 slidably carried by the brake carrier 20. The teeth 74 are spaced apart so as to span the locking bar and engage the teeth on the opposite sides thereof and when the teeth of the latch are in locking engagement with the teeth of the bar these elements are positively locked together.

Rearwardly of the teeth 74 the locking latch member 75 is made yoke shaped so as to clear the hanger brake lever 48 and at its rear end the sides 76 of the yoke portion are operatively connected to the lower end of a vertically disposed control lever 77 which is pivotally connected, intermediate its ends, to the brake carrier 20 by means of a pin 78. The upper end of this lever extends into the path of travel of the member 53, so that when, in effecting an application of the brakes, the member is caused to move toward the right it will engage this end of the lever and cause the lever to rock in a clockwise direction about its pivot pin 78, to the position in which it is shown on dot and dash lines and thereby actuating the locking latch to its unlocking position against the action of springs 79 which are attached at their outer ends to the brake carrier 20 and at their inner ends to the lower ends of the control lever 77.

When in releasing the brakes the member 53 clears the control lever 77 in its travel to its normal release position the springs 79 act to return the lever to its normal release position, and the lever in its movement to this position actuates the locking latch into locking engagement with the locking bar.

It will be noted that when an application of the brakes is being effected the locking latch will be out of locking engagement with the locking bar and that due to this, the brake carrier 20 will move downwardly relative to the wheel and axle assembly as the brake shoes 17 and brake drum 13 wear. When this wear is sufficient to permit the outer end of the carrier to move down a distance slightly greater than the distance between two teeth of the locking bar and the brakes are then released the locking latch will engage the locking bar and lock the carrier to the bar, so that as the brake cylinder lever approaches its release position it will actuate the lever 18 to raise the brake shoes 17 relative to the carrier out of engagement with the brake drum. Since the carrier 20 is locked in its newly adjusted position and the brake shoes 17 are only movable a predetermined fixed distance relative to the carrier, the clearance space between the braking surfaces of the brake shoes and brake drum will be the same upon each release of the brakes.

From the foregoing description it will be understood that when the several parts of the brake mechanism are in their brakes released position, the spring 71 resiliently supports the brake carrier 20 and a spring 80 which is interposed between and engages the upper end of the locking bar and a lug 81 with which the end piece of the truck is provided, yieldably resists upward movement of the locking bar and thereby the outer end of the brake carrier and also constitute a yielding connection between the locking bar and truck frame which will permit the truck frame to move downwardly relative to the brake carrier when, due to excessively heavy service shocks, such downward movement is greater than the clearance distance between the braking surface of the brake shoes 17 and brake drum. This yielding connection will obviously serve to prevent a solid connection from being formed between the truck frame and the brake drum 13 and will thereby prevent damaging forces from being transmitted to the carrier and will of course prevent the brake shoes from engaging the brake drum with excessive force, and as a result prevents an excessive momentary unwanted braking of the wheel and axle assembly.

I am aware of the fact that the member 53 as shown in Figs. 1 to 5, inclusive, will due to friction, have a tendency to resist the force of the brake cylinder when an application of the brakes is being effected and if such frictional resistance should prove to be objectionable the member may be provided with a series of top and bottom rollers 85 and 86 respectively, as shown in Figs. 7 and 8, which are adapted to roll on the web and guide lugs respectively, of the brake carrier 20. Other forms of the strut mechanism in which such frictional resistance will not be present are illustrated in Figs. 9 to 14, inclusive, and will now be described.

In Figs. 9 and 10 another form of strut mechanism is illustrated in which a strut lever 90 is employed in lieu of the longitudinally movable strut member 53. This lever is provided with pairs of laterally spaced arms 91 and 92 which are disposed at an angle to each other and which at the juncture of the arms, are pivotally connected to the side pieces 24 of the brake carrier 20 by means of laterally extending pin 93 to rock in directions longitudinally of the carrier. The upper ends of the arms 91 are preferably integrally connected together by a transversely extending strut portion or web 94. The arms 92 are each provided with a slot 95 which extends longitudinally of the arm, the slots 95 in both arms being in alignment with each other transversely of the carrier.

Normally the arms 92 are disposed as shown in dot and dash lines and the strut portion 94 of the arms 91 are out of the vertical plane of the strut portion 57 of the lever 18, the lever being maintained in this position by a longitudinally extending actuating rod 96 which is operatively connected at one end to the brake cylinder lever in the same manner as the corresponding rod 58 of the apparatus shown in Figs. 1 to 4, inclusive. The other end of the rod is bifurcated to provide spaced side pieces 97 which are each operatively connected to an arm 92 by means of a transversely extending pin 98 which is accommodated by the slots 95 and which is slidably mounted at its ends between vertically spaced guide lugs 99 with which each side piece 24 of the brake carrier 20 is provided.

Carried by the pin 98 and also slidably guided between the vertically spaced lugs 99 is an actuating member 100 which is movable longitudinally of the carrier for effecting the operation of the latch actuating lever 36.

It should here be mentioned that pin 98 carried by the rod 96 is so positioned that the axis thereof will at all times be below the axis of the pivot pin 93 for the lever 90. This will insure against any possibility of dead center locking of the lever when an application of the brakes is being effected.

In operation, the brake cylinder lever 43 in its initial movement will shift the rod 96 in the direction toward the right hand, thereby causing the lever 90 to rock in a counter-clockwise direction about its pivot pin 93. By this movement the arms 91 of the lever move the strut portion 94 to its strut forming position between the web 25 of the brake carrier 20 and the strut portion 57 of the lever.

When the lever 90 is in its final strut forming position as shown in full lines in Fig. 9, the center line of the major portions of the slots 95 will be in horizontal alignment with the axis of the pin 98, so that further movement of the pin to the right will be permitted after the lever comes to a stop. Immediately upon the lever reaching its final position, the continued movement of the rod 96 to the right causes the lever actuating member 100 to actuate the latch control lever 36 to move the locking latch 31 out of its locking engagement with the locking bar 29, thus the outer end of brake carrier 20 is disconnected from the truck frame.

Immediately following the unlocking movement of the locking latch 31 the clasp arranged brake shoes 15 and 16 will be caused to engage the brake drum 13 and cause the brake mechanism and brake carrier to function to effect an application of the brakes, the operation of the several parts being the same as described in connection with the apparatus shown in Figs. 1 to 5, inclusive.

In effecting the release of the brakes the initial movement of the rod 96 to the left causes the lever actuating member 100 to move out of engagement with the latch control lever 36, so that the spring 41 actuates the lever to rock the locking latch into locking engagement with the locking bar. Immediately following this locking operation the pins 93 reach the left hand end of the slots 95 and engage the arms 92 and thereby cause the lever 90 to rock in a clockwise direction to its normal position. Following this operation of the lever, the clasp arranged brake shoes 15 and 16 will be moved out of engagement with the brake drum 13. At substantially the same time as the brake shoes are thus moved the pin 61 will have moved to the beginning of the inclined portion of the slot in the lever 18 so that upon the further release movement of the brake cylinder lever 43 and thereby of the pin 61, the lever will be rocked in a counter-clockwise direction about its pivot pin 19, thus raising the brake shoes 17 out of engagement with the brake drum.

In Figs. 11 and 12 another form of strut mechanism is illustrated which is somewhat similar to the strut mechanism shown in Figs. 9 and 10, the only material difference being that in the mechanism shown in Figs. 11 and 12 a cam member 110 is employed instead of the lever 90. This cam member is rockably mounted on a transversely extending pin 111 carried by the side pieces 24 of the brake carrier 20, and is provided with laterally spaced arms 112 which extend vertically upward when the several parts of the brake mechanism are in their normal brake released position and which are provided with transversely aligned slots 113 for the reception of an actuating pin 98' carried by the member 96 and slidably carried by vertically spaced lugs 99 of the space side pieces 24 of the brake carrier 20. Below the pivot pin 93 the cam member is provided with a cam surface 114 which slidably engages the upper surface of the strut 57 of the lever 18 and which when the brake cylinder lever 43 is moved in the direction to effect an application of the brakes maintains its engagement with the strut portion of the lever 18. When the brake shoes 17 have been moved into engagement with the brake drum 13 the cam member 110 and the pivot pin 111 form a solid connection between the brake carrier 20 and the strut portion 57 of the lever 18 as shown in full lines in Fig. 11. Following the positioning of the brake shoes 17 the member 100, which is formed integral with the rod 96, actuates the latch control lever 36 to move the locking latch 31 out of locking engagement with the locking bar 29.

After the latch 31 has thus been moved the several parts of the brake mechanism function in the same manner as the corresponding parts of the mechanism illustrated in Figs. 1 to 4 inclusive, to effect an application of the brakes.

In releasing the brakes the cam member 110 will be returned to its normal position as shown in dot and dash lines in Fig. 11 immediately following the freeing of the latch control lever 36 by the member 100.

In Figs. 13 and 14 still another form of the strut mechanism is illustrated in which the member 53 having the strut portion 54 is somewhat similar to the corresponding member of the mechanism shown in Figs. 1 to 4 inclusive and in which the member 53 is operated through the medium of a bell-crank lever 120 and the lever 18 instead of by a direct connection with the brake cylinder lever 43 as is the case in the mechanism shown in Figs. 1 to 4.

The bell-crank lever 120 is rockably mounted on a pin 121 carried by laterally spaced lugs 122 which are integral with the brake carrier 20 and which extend downwardly from the lower portion thereof. This lever is provided with an arm 123 which extends upwardly between spaced portions 124 of the lever 18 and which at its end is operatively connected to the member 53 by means of a pin 125, and is further provided with an arm 126 which is operatively connected by a pin 127 to laterally spaced lugs 128 which are integral with and extend downwardly from the spaced portions 124 of the lever 18.

The member 53 differs from the corresponding member of the mechanism shown in Figs. 1 to 4, inclusive, in that at its front edge its lower surface is sloped to permit it to move over the strut portion 57 of the lever 18 as the lever is operated to lower the brake shoes into engagement with the brake drum 13.

In operation, when the lever 18 is actuated by the brake cylinder lever 43 to lower the brake shoes 17 toward the brake drum 13 in initiating an application of the brakes it causes the bell-crank lever 120 to rock about its pivot pin 121 in a clockwise direction from the position in which it is shown in dot and dash lines to that in which it is shown in full lines. As the lever 120 is thus moved the arm 123 thereof causes the member 53 to move to its strut forming position and at substantially the same time as the member is moving to this position the portion 54 of the member actuates the lever 36 to move the locking latch 31 out of engagement with the locking bar 29.

When, in effecting the release of the brakes, the lever 18 is actuated to raise the brake shoes 17 out of engagement with the brake drum 13, the bell-crank lever 120 and cooperating sloping surfaces of the member 53 and strut portion 57 of the lever cause the member to move toward the left. The member when it has been moved a slight distance in this direction clears the lever 36 thereby permitting the locking latch to be moved into locking engagement with the locking bar 29, thus locking the carrier to the truck frame.

The final movement of the brake shoes 17 to their normal release position will occur after the carrier has been locked in place in the same manner as in the mechanism shown in Figs. 1 to 4 inclusive.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a brake mechanism of the type having a plurality of clasp arranged brake elements adapted to be moved into braking engagement with a wheel and axle assembly of a railway vehicle truck, and at least another brake element to which said clasp arranged brake elements, when in braking engagement with said assembly, are adapted to apply braking pressure to assist in braking the assembly, in combination, means for actuating said clasp arranged brake elements and for effecting movement of said other brake element into engagement with said assembly preparatory to the application of braking pressure thereto by said clasp arranged brake elements.

2. In a brake mechanism of the type having a plurality of clasp arranged brake elements adapted to be moved into braking engagement with a wheel and axle assembly of a railway vehicle truck, and at least another brake element to which said clasp arranged brake elements, when in braking engagement with said assembly, are adapted to apply braking pressure to assist in braking the assembly, in combination, means for actuating said clasp arranged brake elements and for effecting movement of said other brake element into engagement with said assembly prior to the braking engagement of said pair of brake elements with said assembly.

3. In a brake mechanism of the type having a plurality of clasp arranged brake elements adapted to be moved into braking engagement with a wheel and axle assembly of a railway vehicle truck, and at least another brake element to which said clasp arranged brake elements, when in braking engagement with said assembly, are adapted to apply braking pressure to assist in braking the assembly, in combination, means for actuating said clasp arranged brake elements, and means controlled by the first mentioned means for effecting movement of said other brake element into engagement with said assembly prior to the clasp arranged brake elements being moved into braking engagement with the assembly.

4. In a brake mechanism of the type having a plurality of clasp arranged brake elements adapted to be moved into braking engagement with a wheel and axle assembly of a railway vehicle truck, and at least another brake element to which said clasp arranged brake elements, when in braking engagement with said assembly, are adapted to apply braking pressure to assist in braking the assembly, in combination, means comprising a brake lever operable to effect the operation of said clasp arranged brake elements, and means operable by said brake lever for effecting movement of said other brake element into contact with said assembly prior to the movement of said clasp arranged brake elements into braking engagement with the assembly.

5. In a brake mechanism of the type having a plurality of clasp arranged brake elements adapted to be moved into braking engagement with a wheel and axle assembly of a railway vehicle truck, and at least another brake element to which said clasp arranged brake elements, when in braking engagement with said assembly, are adapted to apply braking pressure to assist in braking the assembly, in combination, means comprising a brake lever operable to effect the operation of said clasp arranged brake elements, and a pivoted lever rockable by said brake lever for moving said other brake element to its braking position with relation to the assembly prior to the movement of the clasp arranged brake elements into braking engagement with said assembly.

6. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, a brake element for engagement with said assembly and to which said carrier is adapted to transmit the braking pressure applied thereto by said mechanism, and means operable by said brake mechanism for moving said brake element into braking position with relation to said wheel and axle assembly prior to the application of braking pressure thereto by said carrier.

7. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, a brake element for engagement with said assembly and to which said carrier is adapted to transmit the braking pressure applied thereto by said mechanism, and means pivotally mounted on said carrier and operable by said brake mechanism for moving said brake element relative to the carrier into braking position with relation to assembly prior to the braking of the assembly.

8. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, a brake element for engagement with said assembly and to which said carrier is adapted to transmit the braking pressure applied thereto by said mechanism, an a lever extending longitudinally of the carrier and pivotally connected thereto and operable by said brake mechanism for moving said brake element relative to the carrier into braking position with relation to the assembly prior to the braking of the assembly.

9. In a brake mechanism for a wheel and axle assembly of a railway vehicle truck, said mechanism being of the type having a brake carrier movably connected at one end to the frame of the truck and having a brake mechanism carried by said carrier and operative to brake said wheel and axle assembly and to apply braking pressure to the carrier, in combination, a brake element operable to assist in braking said assembly, said brake element being movable relative to the brake carrier by said brake mechanism in effecting an application of the brakes into braking relationship with said assembly, and means movable to a position between said carrier and brake element to form a strut through which braking pressure applied to the carrier is transmitted to said element.

10. In a brake mechanism for a wheel and axle assembly of a railway vehicle truck, said mechanism being of the type having a brake carrier movably connected at one end to the frame of the truck and having a brake mechanism carried by said carrier and operative to brake said wheel and axle assembly and to apply braking pressure to the carrier, in combination, a brake element operable to assist in braking said assembly, said brake element being movable relative to the brake carrier by said brake mechanism in effecting an application of the brakes into braking relationship with said assembly, and means movable to a position between said carrier and brake element to form a strut through which braking pressure applied to the carrier is transmitted to said element, said brake element and means being movable to their respective positions prior to the braking of the assembly and consequently prior to the application of braking pressure to the carrier.

11. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, a brake element operable to assist in braking said assembly, said brake element being movable relative to the brake carrier by said brake mechanism in effecting an application of the brakes into braking relationship with said assembly, and a strut movable by said brake mechanism to a position to transmit braking pressure applied to the carrier to said brake element.

12. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, a brake element operable to assist in braking said assembly, said brake element being movable relative to the brake carrier by said brake mechanism in effecting an application of the brakes into braking relationship with said assembly, and means carried by said brake carrier and movable relative thereto by said brake mechanism to form a strut through which the braking pressure applied to the carrier is transmitted to said brake element.

13. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, a brake element operable to assist in braking said assembly, said brake element being movable relative to the brake carrier by said brake mechanism in effecting an application of the brakes into braking relationship with said assembly, and means carried by said brake carrier and movable relative thereto by said brake mechanism to form a strut through which the braking pressure applied to the carrier is transmitted to said brake element, said means being movable to strut forming position prior to the application of braking pressure to the carrier.

14. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, means normally locking said brake carrier against movement toward said assembly, a brake element to which said brake carrier is adapted to transmit braking pressure, and control mechanism operable by said brake mechanism in effecting an application of the brakes for first moving said brake element into braking relationship with the assembly and for then forming a strut through which the brake carrier transmits braking pressure to said brake element and for finally actuating the locking means to its brake carrier releasing position, said control mechanism being operable prior to the application of braking pressure to said brake carrier.

15. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, means normally locking said brake carrier to the frame of the truck against movement relative to the frame in a direction toward the assembly, a brake element movable relative to the brake carrier by said brake mechanism into braking relationship with said assembly and to which said carrier is adapted to apply braking pressure, and control means movable by said braking means to a position to transmit braking pressure from said brake carrier to said brake element and to then actuate the locking means to unlock the carrier, said means being movable to its control positions prior to the application of braking pressure to said brake carrier.

16. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, means normally locking said brake carrier to the frame of the truck against movement relative to the frame in a direction toward the assembly, a brake element movable relative to the brake carrier by said brake mechanism into braking position with relation to the assembly and to which said brake carrier is adapted to apply braking pressure, means operable by said brake mechanism prior to the application of braking pressure to the brake carrier to form a strut between the brake carrier and the brake element for transmitting braking pressure from the carrier to the element and to actuate the locking means to unlocking position to provide for movement of the brake carrier in the direction toward the assembly as the brake element wears said means being operative in initiating the brake release movement of the brake mechanism to effect the operation of the locking means to lock said brake carrier to the truck frame in the position to which it has moved due to wear of the brake element.

17. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, means normally locking said brake carrier to the frame of the truck against movement relative to the frame in a direction toward the assembly, a brake element movable relative to the brake carrier by said brake mechanism into braking position with relation to the assembly and to which said brake carrier is adapted to apply braking pressure, means operable by said brake mechanism prior to the application of braking pressure to the brake carrier to form a strut between the brake carrier and the brake element for transmitting braking pressure from the carrier to the element and to actuate the locking means to unlocking position to provide for movement of the brake carrier in the direction toward the assembly as the brake element wears said means being operative after the brake carrier is relieved of braking pressure in effecting the brake release movement of the brake mechanism to effect the operation of the locking means to its locking position to lock the brake carrier to the truck frame in the position to which it has moved due to the wear of the brake element.

18. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, a brake element for engagement with said assembly and to which said carrier is adapted to transmit the braking pressure applied thereto by said mechanism, and means operable by said brake mechanism for moving said brake element a fixed distance relative to the brake carrier into and out of braking position with relation to the assembly, said brake carrier being movable in a direction toward the assembly as the brake element wears, and means operable upon the brake releasing movement of the brake mechanism for locking said brake carrier in the position to which it has moved to maintain the braking surface of the brake element a fixed distance from a corresponding braking surface of the assembly regardless of wear of the braking surfaces.

19. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, a brake element for engagement with said assembly and to which said carrier is adapted to transmit the braking pressure applied thereto by said mechanism, and means cooperating with said brake carrier and frame of the truck upon the release operation of the brake mechanism for maintaining the carrier in a fixed position relative to the assembly to provide a fixed movement of the brake element relative to the assembly into braking relationship with said assembly upon a subsequent brake application operation of the brake mechanism, regardless of wear of the brake element.

20. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, a brake element for engagement with said assembly and to which said carrier is adapted to transmit the braking pressure applied thereto by said mechanism, said brake carrier being movable in a direction toward the assembly as the brake element wears, and means for locking said brake carrier in the position it has assumed, due to the wear of the brake element, upon the brake release movement of the brake mechanism for insuring the maintenance of the braking surface of the brake element a substantially fixed distance from the corresponding braking surface of the assembly upon each full release movement of the brake element.

21. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, a brake element operable to assist in braking said assembly, said brake element being movable relative to the brake carrier by said brake mechanism in effecting an application of the brakes into braking relationship with said assembly, and means establishing a rigid connection between said carrier member and brake element through which the braking pressure applied to the carrier is transmitted to the brake element.

22. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, a brake element operable to assist in braking said assembly, said brake element being movable relative to the brake carrier by said brake mechanism in effecting an application of the brakes into braking relationship with said assembly, and means cooperating with said brake carrier and brake mechanism for transmitting braking pressure applied to the carrier to the brake element.

23. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, a brake element operable to assist in braking said assembly, said brake element being movable relative to the brake carrier by said brake mechanism in effecting an application of the brakes into braking relationship with said assembly, and means brought into cooperative relationship with said brake carrier and brake element, upon the braking operation of the brake mechanism, for preventing movement of the brake carrier relative to the brake element when braking pressure is applied to the carrier.

24. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, a brake element operable to assist in braking said assembly, said brake element being movable relative to the brake carrier by said brake mechanism in effecting an application of the brakes into braking relationship with said assembly, and means operative by said brake mechanism in its braking operation to substantially bridge the space between said brake element and carrier and to transmit braking pressure from the carrier to the element.

25. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, a brake element operable to assist in braking said assembly, said brake element being movable relative to the brake carrier by said brake mechanism in effecting an application of the brakes into braking relationship with said assembly, and a strut movable between said brake element and carrier to form a rigid support for the carrier and for transmitting braking pressure from the carrier to the brake element.

26. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, a brake element operable to assist in braking said assembly, said brake element being movable relative to the brake carrier by said brake mechanism in effecting an application of the brakes into braking relationship with said assembly, and a strut pivotally carried by said brake carrier and rockable by said brake mechanism to a position to form a solid connection between said brake element and carrier following the operation of brake element by the brake mechanism and prior to the application of braking pressure to the carrier.

27. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, a brake element for engagement with said assembly and to which said carrier is adapted to transmit the braking pressure applied thereto by said mechanism, a lever pivotally connected to the said brake carrier and operable by said brake mechanism for moving said brake element to its braking position with relation to said wheel and axle assembly, and means operative by said lever to form a rigid connection between said brake carrier and brake element prior to the application of braking pressure to the carrier.

28. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, a brake element for engagement with said assembly and to which said carrier is adapted to transmit the braking pressure applied thereto by said mechanism, a lever pivotally connected to the said brake carrier and operable by said brake mechanism for moving said brake element to its braking position with relation to said wheel and axle assembly, means movably carried by said brake carrier and operable to establish a solid connection between the carrier and said brake element, and another lever operative by the first mentioned lever for actuating said means.

29. In a brake mechanism for a wheel and axle assembly of a railway vehicle truck, said mechanism being of the type having a brake carrier movably connected at one end to the frame of the truck, and having a brake mechanism carried by said carrier and operative to brake said wheel and axle assembly and to apply braking pressure to the carrier, in combination, a brake element for engagement with said assembly and to which said carrier is adapted to transmit the braking pressure applied thereto by said mechanism, a lever pivotally connected to the said brake carrier and operable by said brake mechanism for moving said brake element to its braking position with relation to said wheel and axle assembly, means movably carried by said carrier and operable to establish a solid connection between the carrier and said brake element, and another lever pivotally carried by said brake carrier and operative by the first mentioned lever for actuating said means.

30. In a brake mechanism for a wheel and axle assembly of a railway vehicle truck, said mechanism being of the type having a brake carrier connected at one end to the frame of the truck for movement relative to the frame, and having a brake mechanism carried by said carrier and operative to brake said wheel and axle assembly, in combination, means normally holding said brake carrier against movement relative to the truck frame, said means being operative out of its holding position when the brake mechanism is operated to effect an application of the brakes and being operative to its holding position when the brake mechanism is operated to effect an application of the brakes, a brake element carried by said brake carrier and movable relative to the carrier by the brake mechanism into engagement with the assembly in effecting an application of the brakes and out of engagement with the assembly in effecting the release of the brakes, means operative in effecting an application of the brakes to first form a solid connection between said brake carrier and brake element for transmitting braking pressure from the carrier to the brake element and to then actuate the brake carrier holding means out of its holding position, and operative in effecting the release of the brakes to first effect the movement of the holding means to its holding position and to then eliminate the solid connection between the carrier and element to permit movement of the brake element out of engagement with the wheel and axle assembly.

31. In a brake mechanism for a wheel and axle assembly of a railway vehicle truck, said mechanism being of the type having a brake carrier connected at one end to the frame of the truck for movement relative to the frame, and having a brake mechanism carried by said carrier and operative to brake said wheel and axle assembly, in combination, means normally holding said brake carrier against movement relative to the truck frame, said means being operative out of its holding position when the brake mechanism is operated to effect an application of the brakes and being operative to its holding position when the brake mechanism is operated to effect an application of the brakes, a brake element carried by said brake carrier and movable relative to the carrier by the brake mechanism into engagement with the assembly in effecting an application of the brakes and out of engagement with the assembly in effecting the release of the brakes, means operative as the brake element is moved into engagement with said assembly, in effecting an application of the brakes, to form a strut through which braking pressure is adapted to be transmitted from the brake carrier to the brake element, and control means for actuating the carrier holding means out of its holding position after the strut has been formed between the carrier and element, said control means, when the release of the brakes is being effected, effecting the operation of the carrier holding means into its holding position prior to the operation of the strut forming means out of its strut forming position.

32. In a brake mechanism for a wheel and axle assembly of a railway vehicle truck, said mechanism being of the type having a brake carrier connected at one end to the frame of the truck for movement relative to the frame, and having a brake mechanism carried by said carrier and operative to brake said wheel and axle assembly, in combination, means normally holding said brake carrier against movement relative to the truck frame, said means being operative out of its holding position when the brake mechanism is operated to effect an application of the brakes and being operative to its holding position when the brake mechanism is operated to effect an application of the brakes, a brake element carried by said brake carrier and movable relative to the carrier by the brake mechanism into engagement with the assembly in effecting an application of the brakes and out of engagement with the assembly in effecting the release of the brakes, means operative as the brake element is moved into engagement with said assembly to form a strut through which braking pressure is adapted to be transmitted from the brake carrier to the brake element and to then actuate the brake carrier holding means.

CLYDE C. FARMER.